(12) United States Patent
Wieclawski

(10) Patent No.: US 8,393,677 B2
(45) Date of Patent: Mar. 12, 2013

(54) AUTOMOTIVE SEAT SYSTEM AND METHOD OF STOWING SAME

(75) Inventor: Stanislaw Andrzej Wieclawski, Hohenkammer (DE)

(73) Assignee: Lear Corporation, Southfield, MI (US)

( * ) Notice: Subject to any disclaimer, the term of this patent is extended or adjusted under 35 U.S.C. 154(b) by 335 days.

(21) Appl. No.: 12/548,615

(22) Filed: Aug. 27, 2009

(65) Prior Publication Data

US 2010/0084899 A1   Apr. 8, 2010

(30) Foreign Application Priority Data

Oct. 2, 2008 (DE) .......................... 10 2008 050 301

(51) Int. Cl.
*A47C 15/00* (2006.01)
(52) U.S. Cl. .................. 297/236; 297/235; 297/234
(58) Field of Classification Search .................. 297/234, 297/235, 236
See application file for complete search history.

(56) References Cited

U.S. PATENT DOCUMENTS

| 5,273,336 | A | 12/1993 | Schubring et al. |
| 5,342,111 | A | 8/1994 | Charles |
| 6,102,463 | A | 8/2000 | Swanson et al. |
| 6,811,200 | B2 * | 11/2004 | Shibata et al. ............ 296/64 |
| 7,419,217 | B2 * | 9/2008 | Ishizuka ............ 297/378.12 |
| 7,490,896 | B2 * | 2/2009 | Smith ............ 297/235 |
| 8,033,604 | B2 * | 10/2011 | Behrens et al. ............ 297/236 |
| 2008/0185893 | A1 | 8/2008 | Behrens et al. |

FOREIGN PATENT DOCUMENTS

| DE | 9112213.9 U1 | 9/1991 |
| DE | 102005028033 A1 | 12/2006 |
| DE | 10 2007 053 958 A1 | 8/2008 |
| EP | 1 449 710 A2 | 8/2004 |
| WO | 9617743 | 6/1996 |

OTHER PUBLICATIONS

German Office Action dated Sep. 29, 2010, pp. 1-3.

* cited by examiner

*Primary Examiner* — Laurie Cranmer
(74) *Attorney, Agent, or Firm* — Brooks Kushman P.C.

(57) ABSTRACT

An automotive seat system includes a first seat having a back portion and a bottom portion, and a second seat movably attached with the first seat. The second seat moveable between an extended and folded position. One of the back portion and bottom portion of the first seat configured to receive and stow the second seat if in the folded position.

11 Claims, 4 Drawing Sheets

AUTOMOTIVE SEAT SYSTEM AND METHOD OF STOWING SAME

CROSS-REFERENCE TO RELATED APPLICATIONS

This application claims foreign priority benefits under 35 U.S.C. §119(a)-(d) to DE 10 2008 050 301.0, filed Oct. 2, 2008, which is hereby incorporated by reference in its entirety.

BACKGROUND

Certain automotive vehicle seat configurations are known. As an example, U.S. Pat. No. 5,342,111 to Charles discloses a vehicle auxiliary seat for spanning a space between first and second adjacent structures. In a preferred embodiment, the seat includes a sheet providing a seating surface and a roll for storing the sheet. The sheet has a first free end. The roll is rotatively mounted with the first structure. The seat also includes a connector to removably attach the sheet with the second structure and a ratchet to tension the sheet to a desired tension by rotating the roll. The ratchet has a telescopically extended ratchet arm. The ratchet can only be adjusted to a position tensioning the roll or adjusted to release the tension in the roll when the ratchet handle is extended.

As another example, International Publication Number WO 96/17743 discloses a folding seating unit for a vehicle. The folding seating unit provides a forward or rearward facing seat with a backrest which is capable of being folded flat and sideways against the side of the vehicle beneath the window of the vehicle. The seating unit can be stowed within side trim panels without obscuring windows, or the load carrying area of the vehicle floor. The seating unit includes an outboard leg coupled to the vehicle side and an inboard leg engaging with the vehicle floor. The seating unit also includes a retraction mechanism that provides automatic folding of the inboard leg when the seating unit is folded to its stowed position, and an extending backrest squab which extends the effective height of the backrest when the seat is in a deployed condition, but retracts when the seat is in the stowed position.

As yet another example, U.S. Pat. No. 6,102,463 to Swanson et al. discloses a vehicle seat assembly that has a hidden storage compartment disposed in a seat member of the seat assembly. The seat member is pivotally connected to a support mounted on a vehicle floor and is pivotable between forward and rear positions. The seat member has a seating side which faces upward in the rear position and an oppositely facing storage side which faces upward in the forward position. The storage side includes a recess in the seat member internally defining a storage compartment and has an openable cover normally closing the storage compartment and openable to allow access thereto. The cover forms a storage floor surface when the seat member is in the forward position. The assembly has a releasable latch for retaining the cover in a closed position and preventing spilling of the contents therefrom when the seat member is inverted in the rear position. When the seating member is in the rear position, the storage compartment is hidden from view.

SUMMARY

An automotive seat system includes a first seat having a back portion and a bottom portion, and a second seat movably attached with the first seat. The second seat moveable between an extended and folded position. One of the back portion and bottom portion of the first seat configured to receive and stow the second seat if in the folded position.

An automotive seat system includes a first seat having a back portion and a bottom portion including a fixed frame member and moveable frame member. The fixed frame member and moveable frame member defining a cavity within the bottom portion. The system also includes a second seat moveably attached with the first seat, the bottom portion of the first seat configured to receive and stow the second seat within the cavity.

A method of stowing an automotive vehicle seat includes pivoting a bottom portion of a first seat from a first position to a second position to expose a cavity within the bottom portion of the first seat, moving a second seat hingedly attached with the first seat into the cavity, and pivoting the bottom portion of the first seat from the second position to the first position to stow the second seat within the cavity.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
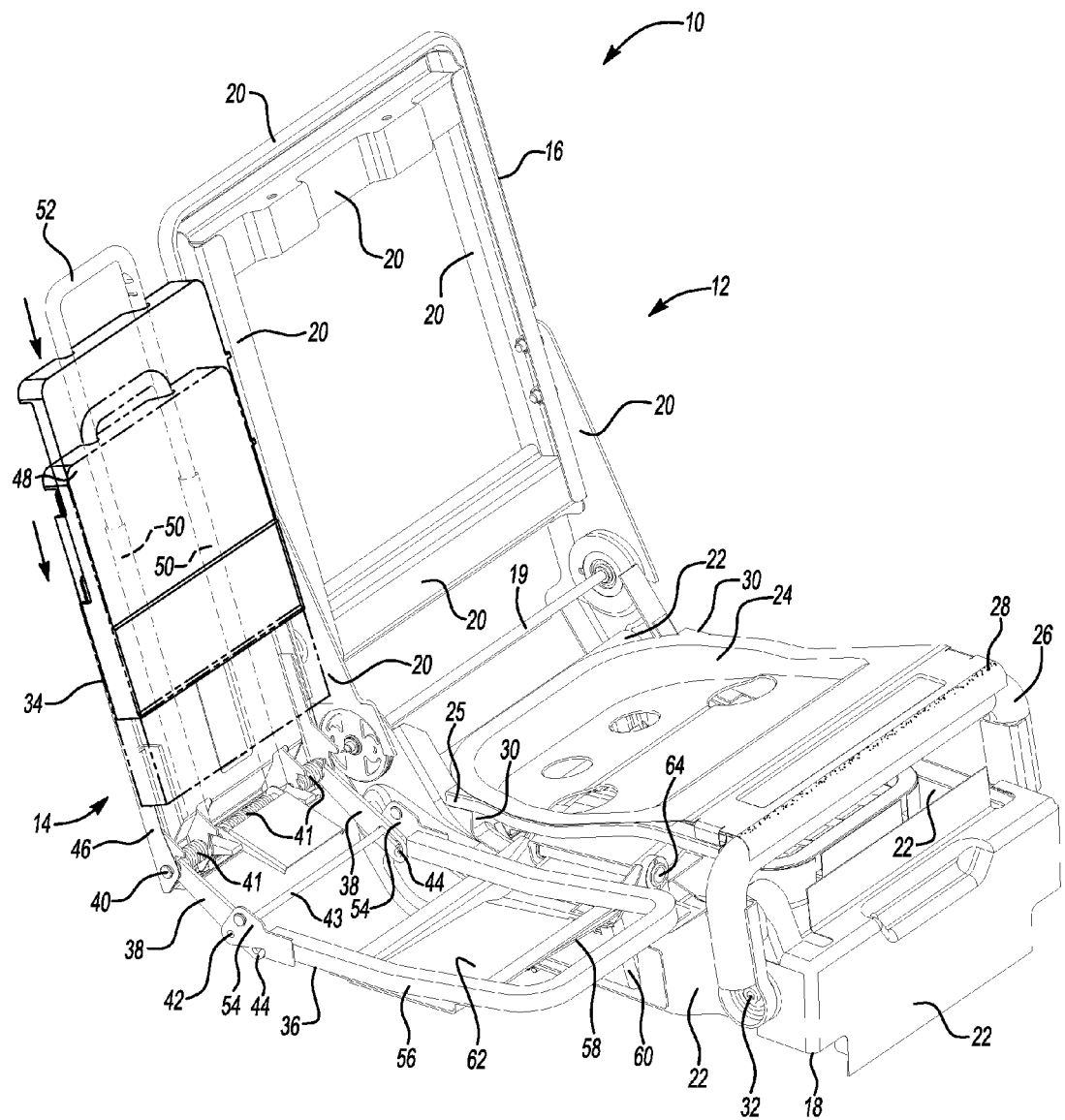
FIG. 1 is a top perspective view of an understructure of a portion of an automotive seat system according to an embodiment of the invention.

Referring now to FIG. 1, an embodiment of an automotive seat system 10 includes a primary seat 12 and a secondary seat 14. As explained in detail below, the secondary seat 14 may be stowed in a bottom portion of the primary seat 12.

The primary seat 12 includes a back portion 16 and a bottom portion 18. The back portion 16 is attached with the bottom portion 18 via a hinge assembly 19. As apparent to those of ordinary skill, the hinge assembly 19 permits the back portion 16 to be adjusted, e.g., rotated, relative to the bottom portion 18. The back and bottom portions 16, 18, however, may be attached in any suitable fashion.

The back portion 16 includes a plurality of support members 20 suitably arranged to support a back of an occupant. As known in the art, the support members 20 may be attached together using any suitable technique. For example, certain of the support members 20 may be fastened together. Other of the support members may be bonded together, etc.

The bottom portion 18 includes a plurality of stationary support members 22 suitably arranged to support a bottom of an occupant. The support members 22 generally do not move relative to one another. As known in the art, the support members 22 may be attached together using any suitable technique, e.g., welding, fastening, etc.

In the embodiment of FIG. 1, the bottom portion 18 also includes a seat pan 24, pan frame 25 and pan member 26. The seat pan 24 is fixedly attached with the pan frame 25 and provides support for a seat cushion (not shown). The pan member 26 of FIG. 1 is generally U-shaped. The pan member 26, however, may have any suitable configuration. The seat pan 24 is fixedly attached, e.g., welded, to the pan member 26 along a seam 28. The pan member 26 provides support for a front of the seat pan 24. The pan member 26 also spaces the front of the seat pan 24 away from the support members 22. The seat pan 24 also rests upon seat pan supports 30. The seat pan supports 30 are each attached, e.g., welded, with one of the support members 22 and space a rear of the seat pan 24 away from the support members 22. A cavity is thus formed between the support members 22 and the seat pan 24. As explained below, the seat 14 may be stowed in this cavity.

The pan member 26 (and thus the seat pan 24 and pan frame 25) is moveable relative to the support members 22 via pivots 32. In the embodiment of FIG. 1, the pivots 32 take the form of a fastened joint that permits the seat pan member 26 to rotate clockwise, as illustrated, relative to the support members 22. Any suitable moveable joint, however, may be used. This clockwise movement of the seat pan 24, pan frame 25 and seat pan member 26 provides access to the cavity discussed above.

The secondary seat 14 includes a back portion 34 and a bottom portion 36. The back portion 34 is attached with the bottom portion 36 via a linkage assembly 38. The linkage assembly 38 is pivotally attached with the back and bottom portions 34, 36 at joints 40, 42 respectively. In the embodiment of FIG. 1, the joint 40 takes the form of a spring loaded joint commonly used in the art. As apparent to those of ordinary skill, this spring loaded joint includes springs 41 (and related mechanisms) that resist rotation of the back portion 34 in one direction and assist rotation of the back portion 34 in the opposite direction. (It is assumed that such spring loaded joints are known and need not be discussed further.) The joint 42 takes the form of a rod-in-channel joint commonly used in the art. As apparent to those of ordinary skill, this rod-in-channel joint includes a rod 43 carried by channels 44 in the linkage assembly 38. The rod 43 may move relative to the linkage assembly 38. (It is assumed that such rod-in-channel joints are known and need not be discussed further.) As apparent to those of ordinary skill, the linkage assembly 38 and joints 40, 42 permit the back portion 34 to be folded toward the bottom portion 36. Of course, the back and bottom portions 34, 36 may be moveably attached in any suitable fashion.

The back portion 34 includes a plurality of support members 46, 48 suitably arranged to support a back of an occupant. In the embodiment of FIG. 1, the support 48 is slidably engaged with the support member 46. The support member 46, for example, may include a track portion (not shown) within which the support member 48 may ride. (It is assumed that techniques for permitting one member to slide relative to another are known and need not be discussed here in further detail.) As illustrated, the support member 48 is in the extended position. That is, it has been raised relative to the bottom portion 36. The support member 48 may be so positioned to extend the available back support for an occupant. The support member 48 may also achieve a collapsed positioned (as indicated by phantom line) in which it is positioned lower relative to the bottom portion 36. The support member 48 may be collapsed prior to the seat 14 being stowed.

The back portion 34 also includes guide members 50 and a head restraint support 52. The guide members 50 of FIG. 1 are configured as tubes fixedly attached with the support member 46. The head restraint support 52 of FIG. 1 is configured as a U-shaped member formed from a tubing having an outer diameter less than the inner diameter of the guide members 50. The guide members 50 may receive the head restraint support 52 and permit the head restraint support 52 to extend and collapse (as indicated by phantom line) relative to the guide members 50. Other configurations are also possible.

The bottom portion 36 includes support members 54, 56 suitably arranged to support a bottom of an occupant. In the embodiment of FIG. 1, the support members 54 are attached with the rod 43 and welded with the support member 56. Any suitable seat bottom configuration, however, may be used.

Figure 2:
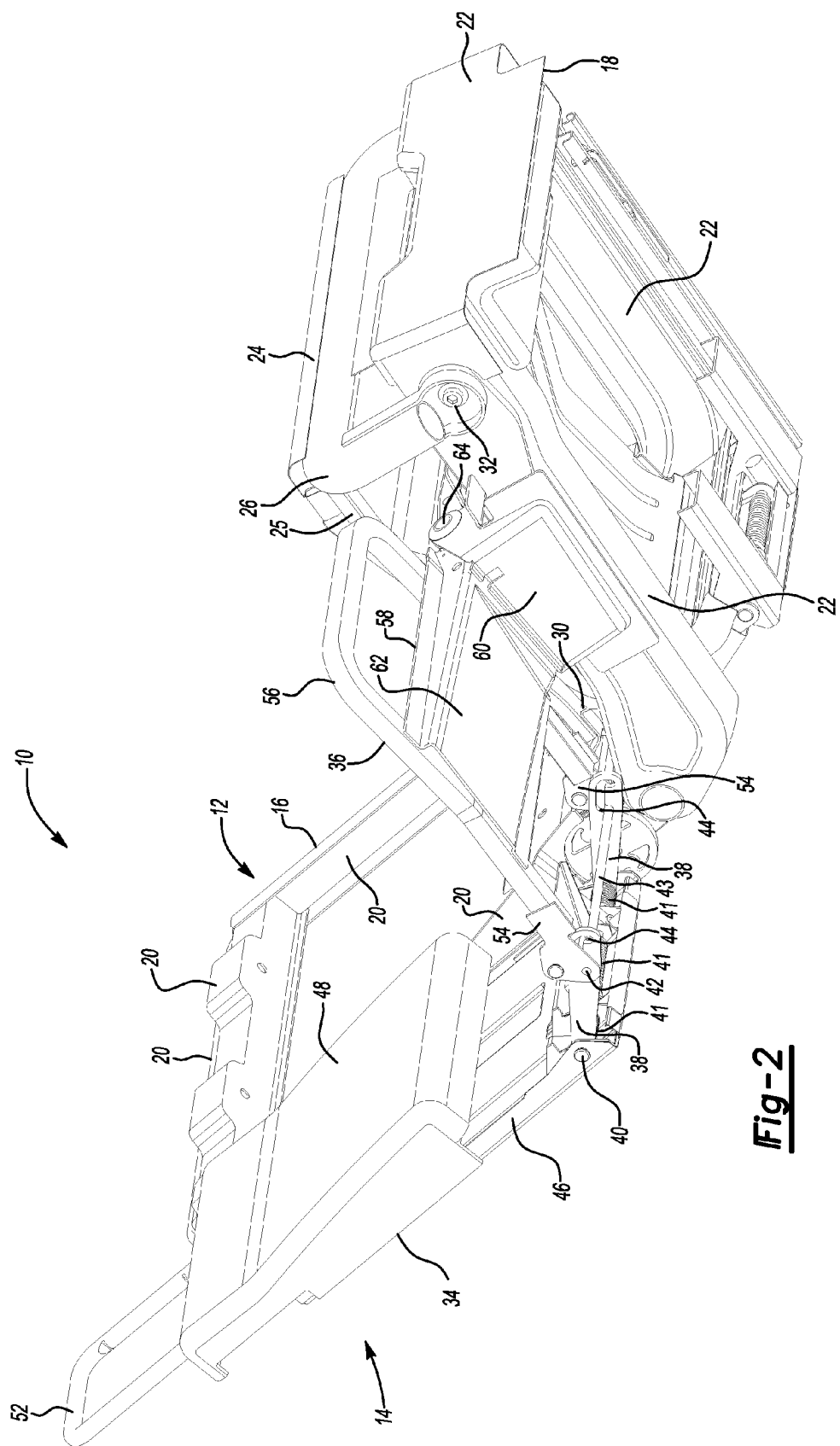
FIG. 2 is a bottom perspective view of the automotive seat system of FIG. 1.

Referring now to FIG. 2, the bottom portion 36 of the secondary seat 14 is moveably attached with the bottom portion 18 of the primary seat 12. In the embodiment of FIG. 2, the bottom portion 36 is hingedly attached with the bottom portion 18 via a hinge assembly 58. The hinge assembly 58 includes first and second panels 60, 62. The first panel 60 is bonded, e.g., welded, with a support member 22 of the primary seat 12 adjacent the secondary seat 14. The second panel 62 is bonded with the support member 56 of the secondary seat 14. Other attachment techniques may also be used. The hinge assembly 58 also includes a hinge portion 64. The hinge portion 64, as illustrated in the embodiment of FIGS. 3 through 6, permits the secondary seat 14 to rotate relative to the primary seat 12 so that the secondary seat 14, when folded and collapsed, may be stowed underneath the seat pan 24. In other embodiments, the secondary seat 14 may be pivotally or otherwise attached with the primary seat 12. As an example, the bottom portion 36 of the secondary seat 14 may be attached with the bottom portion 18 of the primary seat 12 via a two-way telescoping joint. Instead of rotating the seat 14 from the use position illustrated in FIG. 1 to a stowed position within the seat 12, the seat 14, if collapsed, may be slid into the bottom portion 18 of the seat 12 (in a manner similar to a sliding door being slid into a wall).

In other embodiments, the back portion 34 of the secondary seat 14 may be moveably attached with the back portion 16 of the primary seat 12. In such embodiments, the back portion 34 may include moveable support members (similar to those described with reference to FIG. 1) that may be positioned to provide access to a space within the back portion 16 configured to receive and stow the seat 14. Other arrangements and configurations are also possible.

Referring now to FIGS. 3 through 6, numbered elements that differ by 100 relative to the numbered elements of FIGS. 1 and 2 have similar, although not necessarily identical, descriptions to the numbered elements of FIGS. 1 and 2.

Figure 3:
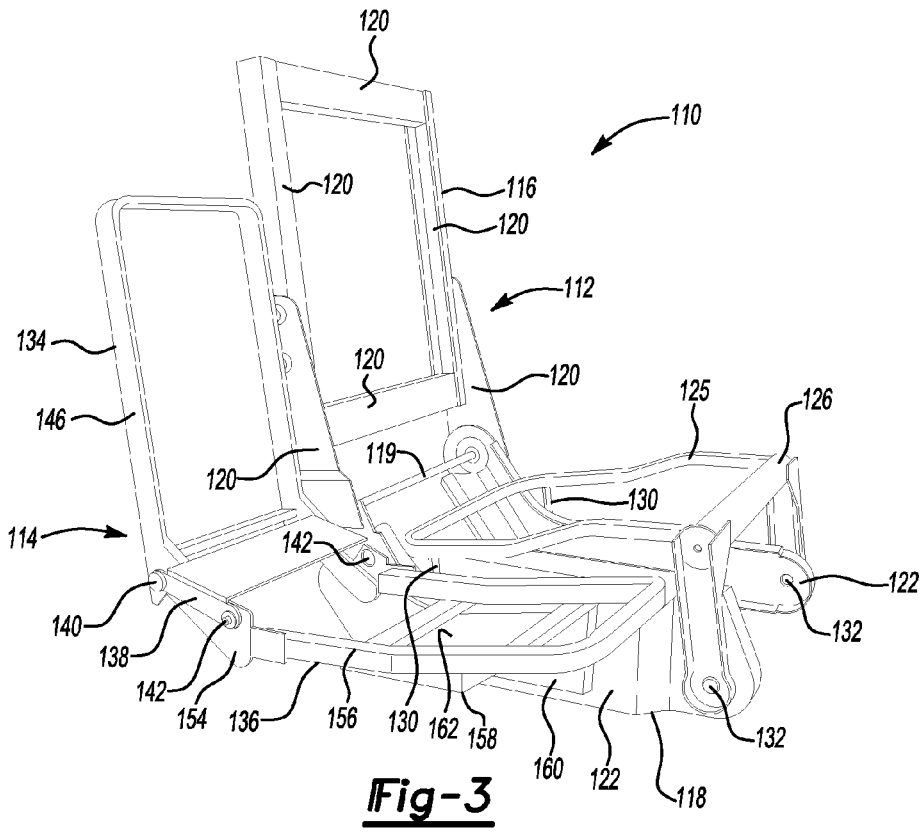
FIGS. 3 through 6 are top perspective views of an understructure of a portion of an automotive seat system according to another embodiment of the invention.
Figure 4:
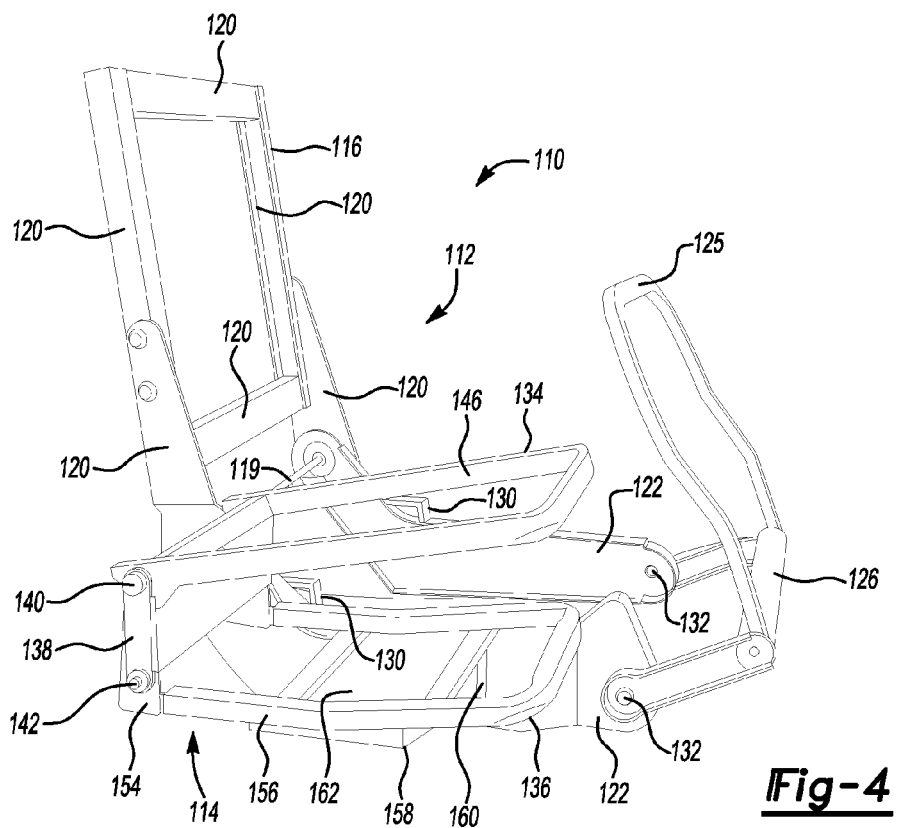
Figure 5:
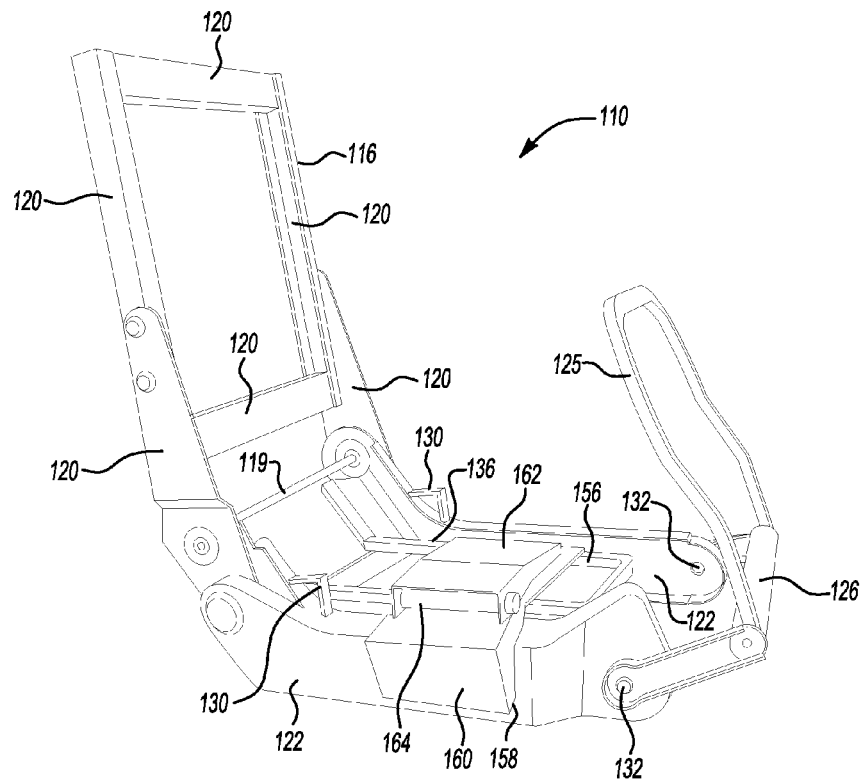
Figure 6:
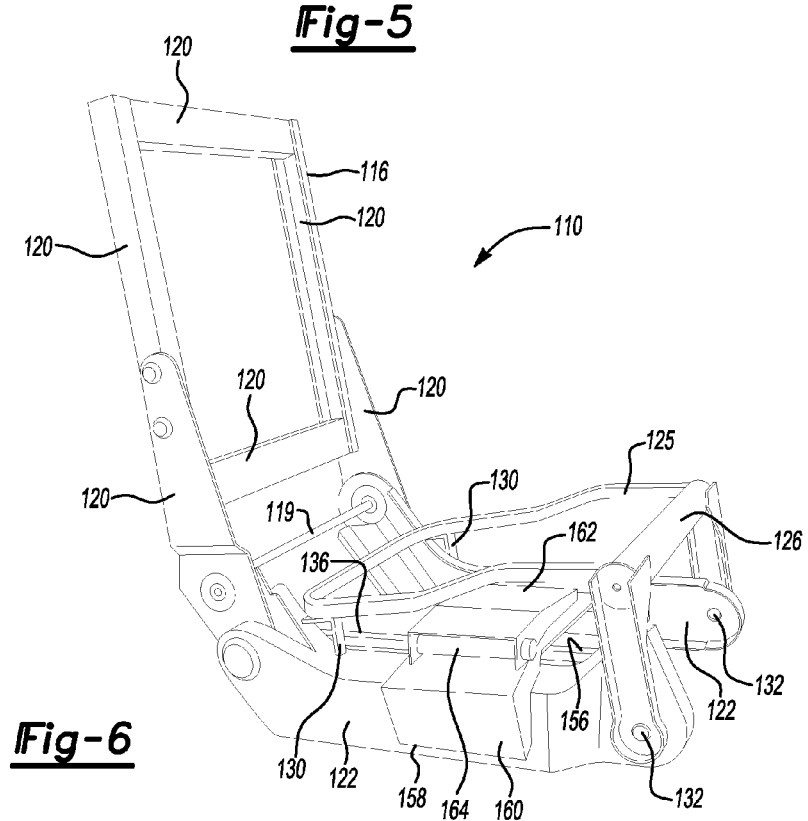

FIG. 3 shows the primary and secondary seats 112, 114 in the use position. FIG. 4 shows the back portion 134 of the secondary seat 114 folded toward the bottom portion 136 (collapsed position), and the pan frame 125 and pan member 126 rotated clockwise. FIG. 5 shows the collapsed secondary seat 114 positioned within the bottom portion 118 of the primary seat 112. FIG. 6 shows the pan frame 125 and pan member 126 rotated counter-clockwise back into the use position.

While example embodiments in accordance with the invention are illustrated and disclosed, such disclosure should not be construed to limit the invention. It is anticipated that various modifications and alternative designs may be made without departing from the scope of the invention.

What is claimed:

1. An automotive seat system comprising:
   a first seat including a back portion and a bottom portion; and
   a second seat movably attached with the first seat, the second seat including a back portion, a bottom portion, and a linkage member pivotally attached to the back and bottom portions of the second seat and arranged to permit the second seat to move between an extended position and folded position, one of the back and bottom portions of the first seat configured to receive and stow the second seat if in the folded position.

2. The system of claim 1 wherein the bottom portion of the first seat includes a fixed frame member and a moveable frame member, the fixed frame member and moveable frame member defining a cavity in which to stow the second seat if in the folded position.

3. The system of claim 2 wherein the moveable frame member is pivotally attached with the fixed frame member.

4. The system of claim 1 wherein the bottom portion of the second seat is hingedly attached with the bottom portion of the first seat.

5. The system of claim 1 wherein the back portion of the second seat includes first and second support members, the second support member moveable between a collapsed position and extended position relative to the first support member.

6. The system of claim 1 wherein the second seat further includes a head rest moveable between a collapsed position and extended position relative to the back portion of the second seat.

7. An automotive seat system comprising:
a first seat having a back portion and a bottom portion including a fixed frame member and moveable frame member, the fixed frame member and moveable frame member defining a cavity within the bottom portion; and
a second seat moveably attached with the first seat, the second seat having a back portion, a bottom portion, and a linkage member pivotally attached to the back and bottom portions of the second seat and arranged to permit the second seat to move between an extended position and folded position, the bottom portion of the first seat configured to receive and stow the second seat within the cavity if in the folded position.

8. The system of claim 7 wherein the second seat is hingedly attached with the bottom portion of the first seat.

9. The system of claim 7 wherein the back portion of the second seat has first and second support members, the second support member moveable between a collapsed position and extended position relative to the first support member.

10. The system of claim 7 wherein the second seat further has a head rest moveable between a collapsed position and extended position relative to the back portion of the second seat.

11. The system of claim 7 wherein the moveable frame member is pivotally attached with the fixed frame member.

\* \* \* \* \*